United States Patent
Heverley, III et al.

(10) Patent No.: US 9,238,468 B2
(45) Date of Patent: Jan. 19, 2016

(54) SYSTEMS AND METHODS FOR CONTROLLING EXHAUST FLOW THROUGH AN AFTERTREATMENT DEVICE

(75) Inventors: Lawrence Hoey Heverley, III, Lawrence Park, PA (US); Shashi Kiran, Lawrence Park, PA (US); Stephen Mark Geyer, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 122 days.

(21) Appl. No.: 13/236,929

(22) Filed: Sep. 20, 2011

(65) Prior Publication Data
US 2013/0067887 A1 Mar. 21, 2013

(51) Int. Cl.
| | |
|---|---|
| *F01N 3/00* | (2006.01) |
| *B61C 5/04* | (2006.01) |
| *F01N 3/031* | (2006.01) |
| *F01N 3/021* | (2006.01) |

(52) U.S. Cl.
CPC . *B61C 5/04* (2013.01); *F01N 3/021* (2013.01); *F01N 3/031* (2013.01); *F01N 2410/00* (2013.01); *F01N 2590/08* (2013.01); *F01N 2900/12* (2013.01); *Y02T 10/20* (2013.01)

(58) Field of Classification Search
CPC ..... F01N 3/0253; F01N 9/002; F01N 3/0814; F01N 3/0821; F01N 3/0842; F01N 3/085; F01N 3/0878; F01N 3/0885; F01N 3/035; F01N 3/0233; F01N 3/031; F01N 3/021; F01N 2590/08; F01N 2900/12; F01N 2410/00; B01D 53/8609; B61C 5/04; Y02T 10/20; F02D 41/021; F02D 41/029; F02D 25/00; F02D 29/02

USPC ........... 60/292, 291, 287, 285, 311, 273, 288, 60/602; 123/568.11
See application file for complete search history.

(56) References Cited

U.S. PATENT DOCUMENTS

| | | | |
|---|---|---|---|
| 4,217,757 A * | 8/1980 | Crone, Jr. ........................ | 60/288 |
| 4,698,761 A | 10/1987 | Cooper et al. | |
| 5,425,338 A | 6/1995 | Gottemoller | |

(Continued)

FOREIGN PATENT DOCUMENTS

| | | | |
|---|---|---|---|
| DE | 102010005831 | * | 1/2010 |
| DE | 102010005831 A1 | * | 7/2011 |

(Continued)

OTHER PUBLICATIONS

Gallager et al, U.S. Appl. No. 13/186,695, entitled "System and Method for Regenerating a Particulate Filter", filed Jul. 20, 2011.

(Continued)

*Primary Examiner* — Jesse Bogue
*Assistant Examiner* — Kelsey Stanek
(74) *Attorney, Agent, or Firm* — GE Global Patent Operation; John A. Kramer

(57) ABSTRACT

Various methods and systems are provided for a system for an engine. In one example, the system includes an exhaust passage through which exhaust gas is configured to flow from the engine. The system further includes an aftertreatment system disposed in the exhaust passage, the aftertreatment system including an aftertreatment device and a bypass with a bypass control element, the bypass control element adjustable to reduce exhaust gas flow through the aftertreatment device during tunneling operation.

24 Claims, 5 Drawing Sheets

(56) References Cited

U.S. PATENT DOCUMENTS

| | | | |
|---|---|---|---|
| 5,561,602 | A | 10/1996 | Bessler et al. |
| 6,880,524 | B2 | 4/2005 | Gates et al. |
| 7,021,220 | B2 | 4/2006 | Harada et al. |
| 7,072,747 | B2 | 7/2006 | Armbruster et al. |
| 7,162,861 | B2 | 1/2007 | Khair |
| 7,198,038 | B2 | 4/2007 | McLain |
| 7,314,041 | B2 | 1/2008 | Ogawa et al. |
| 7,721,532 | B2 | 5/2010 | Liu et al. |
| 8,572,951 | B2 * | 11/2013 | Gallagher et al. .............. 60/295 |
| 2005/0109882 | A1 * | 5/2005 | Armbruster et al. ...... 246/167 R |
| 2008/0028751 | A1 * | 2/2008 | Stroia et al. ..................... 60/286 |
| 2009/0044531 | A1 | 2/2009 | Lu et al. |
| 2009/0090100 | A1 | 4/2009 | Kajino |
| 2009/0151331 | A1 * | 6/2009 | Tsujimoto et al. .............. 60/286 |
| 2009/0178406 | A1 | 7/2009 | Matthews et al. |
| 2009/0277429 | A1 | 11/2009 | Marsh et al. |
| 2010/0005786 | A1 | 1/2010 | Hinz et al. |
| 2011/0072800 | A1 * | 3/2011 | Bidner et al. ................... 60/286 |
| 2011/0179770 | A1 * | 7/2011 | Schmuck-Soldan ............ 60/273 |
| 2011/0283682 | A1 * | 11/2011 | Gallagher et al. .............. 60/274 |
| 2012/0304887 | A1 * | 12/2012 | Gokhale ..................... 105/62.1 |

FOREIGN PATENT DOCUMENTS

| | | | |
|---|---|---|---|
| FR | 2921969 | * | 4/2009 |
| FR | 2921969 A1 | * | 4/2009 |
| JP | 10329717 | | 5/1995 |
| JP | 07117669 | | 12/1998 |
| WO | 0108958 A1 | | 2/2001 |
| WO | 2009111097 A3 | | 9/2009 |
| WO | 2011087819 A2 | | 7/2011 |

OTHER PUBLICATIONS

Henry et al, U.S. Appl. No. 13/186,641, entitled "Method and System for Controlling an Engine During Tunneling Operation", filed Jul. 20, 2011.

Swenson et al, U.S. Appl. No. 12/816,063, entitled "Method and System for Controlling Engine Performance", filed Jun. 15, 2010.

Search Report and Written Opinion from corresponding PCT Application No. PCT/US2012/053034 dated Dec. 11, 2012.

* cited by examiner

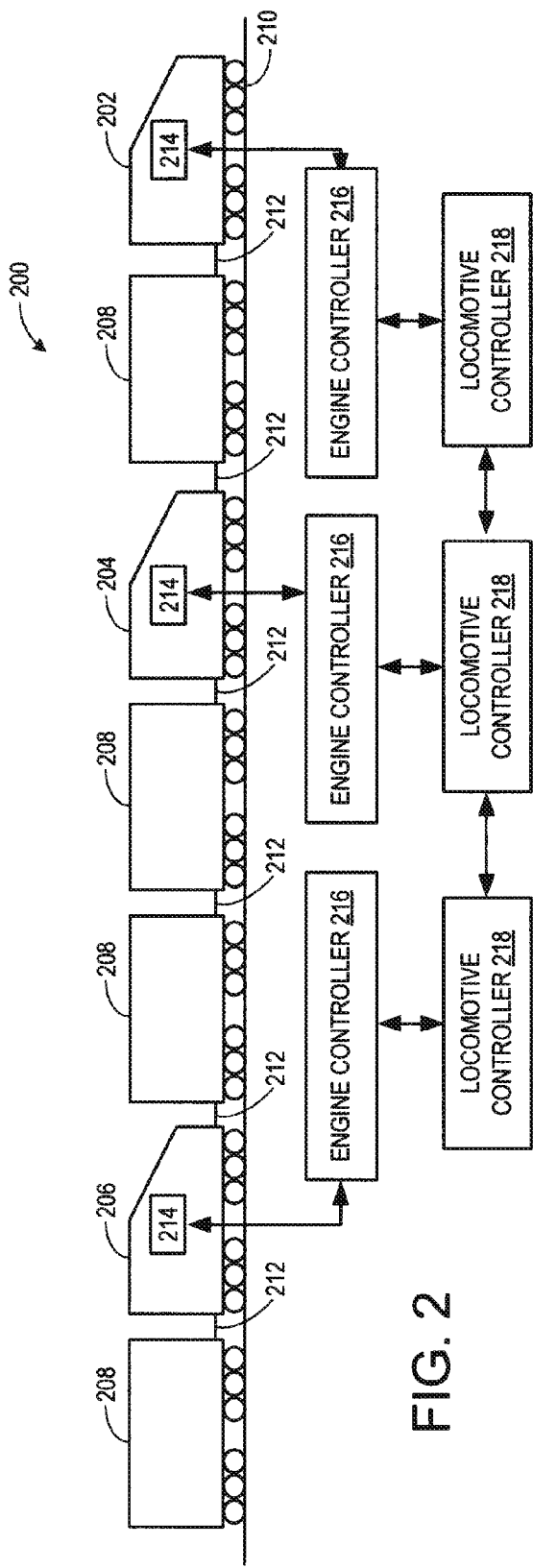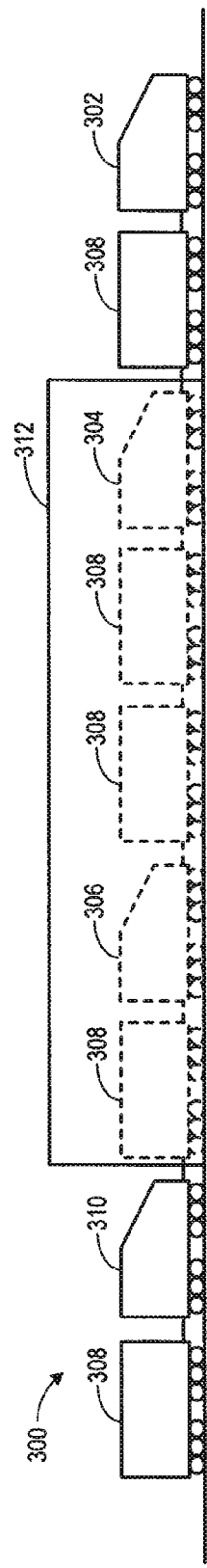

SYSTEMS AND METHODS FOR CONTROLLING EXHAUST FLOW THROUGH AN AFTERTREATMENT DEVICE

FIELD

Embodiments of the subject matter disclosed herein relate to systems and methods for an engine with an aftertreatment system.

BACKGROUND

Some vehicles, such as rail vehicles, may undergo tunneling operation in which the vehicle travels through a confined space, such as a tunnel. During tunneling operation, temperatures of various components of the vehicle, such as an engine, an aftertreatment system, and a cooling system, may increase. In some examples, the temperatures may increase substantially, leading to decreased power and overheating of the engine of the rail vehicle.

In one example, during tunneling operation, due to induction of exhaust gas from its own engine, from the exhaust of other engines in a train to which the vehicle is coupled, or from other engines which previously operated in the tunnel, a temperature of exhaust gas from the engine increases and a level of engine out soot increases. As such, a temperature of the aftertreatment system increases and a loading rate of an aftertreatment device of the aftertreatment system increases. When the aftertreatment device is overloaded with soot, clogging of the aftertreatment device may occur, resulting in increased backpressure on the engine which can eventually choke and shut down the engine. Further, when combustible material such as soot overloads the aftertreatment device at high enough temperatures, the soot may begin burning and the reaction may run away (e.g., runaway regeneration), leading to degradation of the aftertreatment system.

BRIEF DESCRIPTION

In one embodiment, a system for an engine includes an exhaust passage through which exhaust gas is configured to flow from the engine. The system further includes an aftertreatment system disposed in the exhaust passage. The aftertreatment system includes an aftertreatment device and a bypass with a bypass control element. The bypass control element is adjustable to reduce exhaust gas flow through the aftertreatment device during tunneling operation.

By including a bypass with a bypass control element around the aftertreatment device, exhaust gas flow can be routed away from the aftertreatment device during conditions such as tunneling operation. Thus, when the exhaust gas temperature increases and/or a level of exhausted particulate matter (e.g., soot) increases during tunneling operation, the bypass control element may be adjusted to reduce exhaust gas flow through the aftertreatment device. In this manner, a temperature of the aftertreatment device may be maintained at a lower temperature and soot build-up in the aftertreatment device may be reduced, resulting in reduced backpressure on the engine and reduced degradation of the aftertreatment device.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 2 shows a schematic diagram of a train including a plurality of rail vehicles.

FIG. 3 shows a schematic diagram of a train passing through a tunnel.

DETAILED DESCRIPTION

The following description relates to various embodiments of systems and methods for an aftertreatment system positioned in an exhaust passage of the engine. In one exemplary embodiment, a system for an engine includes an exhaust passage through which exhaust gas is configured to flow from the engine. The system further includes an aftertreatment system disposed in the exhaust passage. The aftertreatment system includes at least one aftertreatment device and a bypass with a bypass control element. The bypass control element is adjustable to reduce exhaust gas flow through the aftertreatment device during tunneling operation. In such a configuration, when an exhaust gas temperature increases and/or a level of particulate matter (e.g., soot) output by the engine increases during tunneling operation, the bypass control element may be adjusted to reduce exhaust gas flow through the aftertreatment device. As such, a temperature of the aftertreatment device may be maintained at a lower temperature and soot build-up in the aftertreatment device may be reduced, resulting in reduced backpressure on the engine and reduced degradation of the aftertreatment device. Further, the bypass control element may be adjusted to reduce exhaust gas flow through the aftertreatment device during engine operation when the vehicle is not travelling through a tunnel, such as after during engine start-up or during transient conditions. In this manner, engine operation may be improved and degradation of the aftertreatment device may be reduced during non-tunneling operation.

The approach described herein may be employed in a variety of engine types, and a variety of engine-driven systems, including semi-mobile or mobile platforms. Semi-mobile platforms may be relocated between operational periods, such as mounted on flatbed trailers. Mobile platforms include self-propelled vehicles. Such vehicles can include on-road transportation vehicles and off-highway vehicles (OHV) such as rail vehicles, mining equipment, and marine vessels. For clarity of illustration, a locomotive or other rail vehicle is provided as an example mobile platform supporting a system incorporating an embodiment of the invention.

Figure 1:
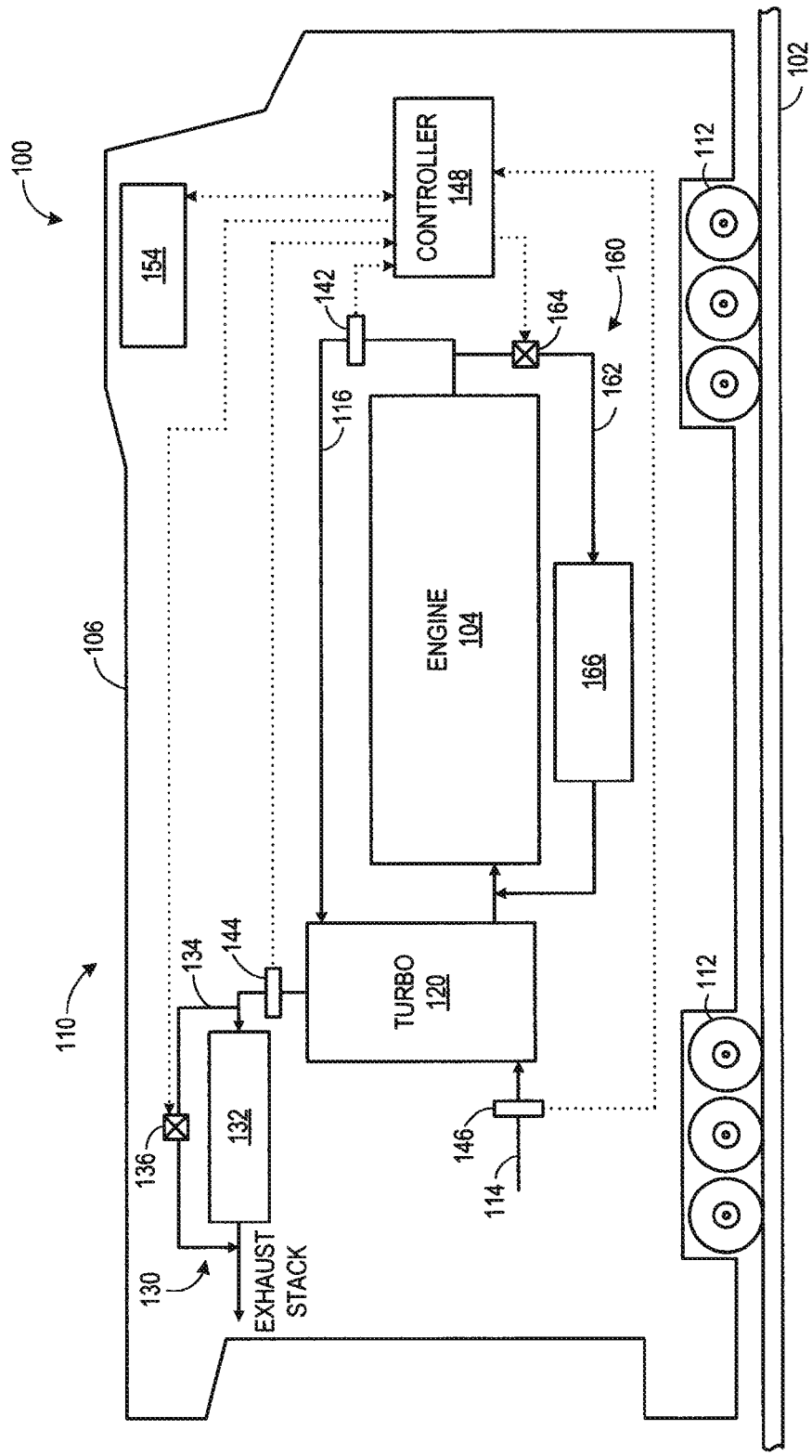
FIG. 1 shows a schematic diagram of an engine including an aftertreatment system with a valved bypass.

Before further discussion of the aftertreatment device bypassing approach, an example of a rail vehicle (on which embodiments of the invention may be deployed) will be described, to provide context. For example, FIG. 1 shows a block diagram of an exemplary locomotive or other rail vehicle 106, which is configured to run on a rail 102 via a plurality of wheels 112. As depicted, the rail vehicle 106 includes an internal combustion engine 104. (Other embodiments of the invention are applicable to engines in a marine vessel or other off-highway vehicle propulsion system, as noted above.)

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including natural gas, gasoline, kerosene, biodiesel, or other petroleum distillates of similar density through compression ignition (and/or spark ignition).

The engine system 110 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

The engine system 110 further includes an aftertreatment system 130 coupled in the exhaust passage downstream of the turbocharger 120. The aftertreatment system 130 may include one or more aftertreatment devices 132. In one example embodiment, the aftertreatment system 130 may include a diesel particulate filter (DPF). In other embodiments, the aftertreatment system 130 may additionally or alternatively include a diesel oxidation catalyst (DOC), a selective catalytic reduction (SCR) catalyst, a three-way catalyst, a $NO_x$ trap, or various other emission control devices or combinations thereof. The DPF may be cleaned via regeneration, which may be employed as active regeneration by increasing the temperature for burning particulate matter that has collected in the filter. Passive regeneration may occur when a temperature of the exhaust gas is high enough to burn the particulate matter in the filter. During active regeneration, air-fuel ratio or other operating parameters may be adjusted and/or fuel may be injected and burned in the exhaust passage upstream of the DPF in order to drive the temperature of the DPF up to a temperature where the particulate matter will burn.

When the vehicle operates outside a tunnel, the intake air received in the intake passage 114 is formed of mostly fresh air, even if the locomotive is positioned in a train with other locomotive engines operating and exhausting exhaust gases in to the ambient air. However, when the locomotive operates in a tunnel (as described further below with regard to FIG. 2), the intake air received in the intake passage 114 may include a substantial amount of exhaust gas (either from its own engine, or from the exhaust of other engines in the train or from engines previously operating in the tunnel). The increased exhaust gas inducted through the engine causes an increased level of particulate matter, such as soot, in the exhaust passage 116 that is delivered to the aftertreatment system 130 that includes the particulate filter. Due to an increased loading rate of the particulate filter, the particulate filter may become clogged during tunneling operation resulting in increased backpressure on the engine and eventually leading to engine stall.

Thus, as depicted in FIG. 1, the aftertreatment system 130 further includes a bypass 134 with a bypass control element 136 that may be controlled to adjust the flow of exhaust gas around the aftertreatment device 132. For example, the bypass control element 136 is operably coupled with the bypass 134 such that a position of the bypass control element 136 governs an extent to which the bypass 134 is open for passage of fluid such as exhaust gas. The bypass control element 136 may be any element that can be controlled to selectively partially or completely block a passage. As an example, the bypass valve may be a gate valve, a butterfly valve, a globe valve, an adjustable flap, or the like. In one example, the system is configured for the bypass control element 136 to be adjusted to reduce exhaust gas flow through the aftertreatment device during tunneling operation. For example, in one embodiment, the system includes a control unit, which may include a controller 148 described below, that is configured to adjust the bypass control element 136 (e.g., by generating control signal(s) to which the valve is responsive) to reduce exhaust gas flow through the aftertreatment system, in response to an indication of tunneling operation. As will be described in greater detail below with reference to FIG. 4, tunneling may be indicated based on an operating condition such as a reduced intake oxygen concentration, a reduced exhaust oxygen concentration, an increase in pressure in the exhaust passage upstream of the aftertreatment system, an increase in a particulate matter loading rate, or the like.

In another embodiment, the bypass control element 136 is configured to self-actuate to an at least partially open position during tunneling operation, for reducing the exhaust gas flow through the aftertreatment system. (For this purpose, in such an embodiment, the valve could include a temperature-dependent actuation mechanism, such as a bi-metal member, that is responsive to a temperature associated with the transient operating condition.) In one example, the bypass control element 136 may be opened such that exhaust gas flow through the aftertreatment device is substantially reduced during tunneling operation.

In some examples in which the aftertreatment system includes more than one aftertreatment device, the bypass may be configured to route exhaust gas around some, but not all of the aftertreatment devices. As an example, if the aftertreatment system includes two aftertreatment devices, only one of the aftertreatment devices may be bypassed. As another example, if the aftertreatment system includes four aftertreatment devices, one, two, or three of the aftertreatment devices may be bypassed. In other examples, all of the aftertreatment devices may be bypassed.

The engine system 110 further includes an exhaust gas recirculation (EGR) system 160, which routes exhaust gas from the exhaust passage 116 upstream of the turbocharger 120 to the intake passage 114 downstream of the turbocharger 120. The EGR system 160 includes an EGR passage 162 and an EGR valve 164 operably disposed in the EGR passage 162 for controlling an amount of exhaust gas that is recirculated from the exhaust passage 116 of engine 104 to the intake passage 114 of engine 104. By introducing exhaust gas to the engine 104, the amount of available oxygen for combustion is decreased, thereby reducing the combustion flame temperatures and reducing the formation of nitrogen oxides (e.g., NO$_x$). The EGR valve 164 may be an on/off valve controlled by the controller 148, or it may control a variable amount of EGR, for example. It should be understood, the EGR valve 164 may be any element that can be controlled to selectively partially or completely block a passage. As an example, the EGR valve may be a gate valve, a butterfly valve, a globe valve, an adjustable flap, or the like. In some embodiments, as shown in FIG. 1, the EGR system 160 further includes an EGR cooler 166 to reduce the temperature of the exhaust gas before it enters the intake passage 114. As shown in the non-limiting example embodiment of FIG. 1, the EGR system 140 is a high-pressure EGR system. In other embodiments, the engine system 110 may additionally or alternatively include a low-pressure EGR system, routing EGR from downstream of the turbine to upstream of the compressor.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors, as further elaborated herein, in order to determine operating parameters and operating conditions, and correspondingly adjust various engine actuators to control operation of the rail vehicle 106. For example, the controller 148 may receive signals from various engine sensors including, but not limited to, engine speed, engine load, boost pressure, exhaust pressure 144, ambient pressure, exhaust temperature, intake oxygen concentration 146, exhaust oxygen concentration 142, etc. Correspondingly, the controller 148 may control the vehicle system 100 by sending commands to various components such as traction motors, alternator, cylinder valves, throttle, etc.

In one example, the controller 148 may estimate geographic coordinates of rail vehicle 106 using signals from positioning sensor, such as a Global Positioning System (GPS) receiver 154. Geographic coordinates of the vehicle 106 may be estimated or calculated. For example, a GPS signal from the GPS receiver 154 may be used to calculate the geographic coordinates of the vehicle. Geographic features in the path of the vehicle, such as the rail vehicle 106, may be signaled by an operator or calculated. For example, geographic coordinates of a set of predefined geographic features may be stored in a table. A distance between the vehicle and the set of predefined geographic features may be calculated so that the nearest geographic feature and its distance may be determined. Non-limiting examples of geographic features that may be stored in the set of predefined geographic features include a tunnel entrance, a tunnel exit, a steep grade, and a city boundary. Further, the GPS may include stored information about the predefined geographic features, such as length of a tunnel and grade of the tunnel.

Additionally, positional information of the vehicle may also be determined based on operating conditions. For example, based on a transiently increased engine intake air temperature and/or increased coolant temperature, for example, the vehicle may identify that the vehicle has entered a tunnel. One example of a transiently increased temperature may be a temperature that changes by more than a threshold number of degrees per minute for a threshold duration. Similarly, a transiently decreasing temperature may indicate that the vehicle has exited the tunnel. Such positional information may be related by one vehicle to another in a train, so that other vehicles in the train (such as vehicles toward a rear of the train relative to a direction of travel) can determine their position relative to the tunnel.

In some embodiments, an upgrade kit that may be installed in a rail vehicle includes a bypass for an aftertreatment system, a bypass control element, and a non-transient computer readable medium including instructions for controlling the bypass control element in response to tunneling operation, as described above. The upgrade kit may further include one or more sensors or other mechanical elements, such as pressure sensors, temperature sensors, and the like.

The rail vehicle 106 depicted in FIG. 1 may be one of a plurality of rail vehicles that make up a rail vehicle consist (e.g., train), such as the exemplary train 200 shown in FIG. 2. The train 200 includes a plurality of rail vehicles, such as locomotives 202, 204, 206 and cars 208, configured to run on track 210. The plurality of locomotives 202, 204, 206 include a lead locomotive 202 and one or more remote locomotives 204, 206. While the depicted example shows three locomotives and four cars, any appropriate number of locomotives and cars may be included in train 200. Further, in the example of FIGS. 2-3 the train 200 is traveling to the right, although the train may travel in either direction.

The locomotives 202, 204, 206 are each powered by a respective engine 214, while the cars 208 may be non-powered (at least in regard to being incapable of self-propulsion). In one example, locomotives 202, 204, 206 may be diesel-electric locomotives powered by diesel engines. However, in alternate embodiments, the locomotives may be powered with an alternate engine configuration, such as a gasoline engine, a biodiesel engine, a natural gas engine, or wayside (e.g., catenary, or third-rail) electric, for example.

The locomotives 202, 204, 206 and cars 208 are coupled to each other through couplers 212. While the depicted example illustrates locomotives 202, 204, 206 connected to each other through interspersed cars 208, in alternate embodiments, the one or more locomotives may be connected in succession, as a consist, while the one or more cars 208 may be coupled to a remote locomotive (that is, a locomotive not in the lead consist) in succession.

Each locomotive may include a locomotive controller 218 configured to receive information from, and transmit signals to, each of the locomotives of the train 200. Further, the locomotive controller 218 may receive signals from a variety of sensors on the train 200, and adjust train operations accordingly. Each locomotive controller 218 may be coupled to an engine controller 216, such as the controller 148 described above with reference to FIG. 1, for adjusting engine operations of each locomotive. As elaborated with reference to FIGS. 4 and 5, each engine controller 216 may receive a signal regarding a position of an approaching tunnel or a tunnel exit with respect to a position of its locomotive of the train. When tunneling operation is detected, each engine controller 216 may adjust the bypass valve of the aftertreatment bypass to reduce exhaust flow through the aftertreatment system positioned in its locomotive based on the conditions of the tunnel. When the tunnel exit is detected, each engine controller 216 may adjust the bypass valve of the aftertreatment bypass to increase exhaust flow through the aftertreatment system positioned in its locomotive based on a temperature and/or load of the aftertreatment device of the aftertreatment system.

FIG. 3 shows an example of a train including a plurality of rail vehicles passing through a tunnel. Specifically, FIG. 3 shows an example of a train 300, such as the train 200 described with reference to FIG. 2, with a leading locomotive 302 that has exited the tunnel 312, remote locomotives 304 and 306 that are inside the tunnel 312, a remote locomotive 310 that has not yet entered the tunnel 312, and a plurality of cars 308. As described below, bypassing of an aftertreatment system positioned in each locomotive may occur during tunneling operation.

Each engine of each vehicle may include an independent aftertreatment bypass control element control, where each vehicle may independently bypass its engine's aftertreatment device based upon its particular positional relationship to other locomotives in the train, its position inside the tunnel, and/or conditions of each aftertreatment device. For example, a first aftertreatment device with a higher particulate load that is disposed in the remote locomotive 304 in the tunnel 312 may be bypassed at a later position in the tunnel than a second aftertreatment device with a lower particulate load that is disposed in the remote locomotive 306. In such an example, because only one locomotive is ahead of the remote locomotive 304 and two locomotives are ahead of the remote locomotive 306, the remote locomotive 304 may ingest less exhaust gas in the tunnel 312 resulting in a reduced need for reducing exhaust gas flow through its aftertreatment device.

In some examples, bypass control elements of each locomotive may be opened at the same position inside the tunnel, however, the degree to which the bypass control element is opened and the resulting reduction in exhaust gas flow through the corresponding aftertreatment device may differ based on the conditions of each aftertreatment device and the position of the locomotive in the train. For example, the bypass control element may be controlled to open when the controller receives a signal from a GPS system that the locomotive has entered the tunnel 312. In such an example, minimal bypassing of an aftertreatment device disposed in the leading locomotive 302 may occur when the leading locomotive 302 enters the tunnel 312, however, the bypass valve of the remote locomotive 310 may be adjusted to be fully open when the remote locomotive 310 enters the tunnel 312 due to the large amount of exhaust gas in the tunnel 312 from locomotives 302, 304, and 306.

In other examples, such as described below with reference to FIG. 4, each bypass control element may be individually controlled based on operating conditions of the corresponding locomotive. For example, tunneling operation may be indicated by reduced intake or exhaust gas oxygen concentrations, an increase in back pressure on the engine, an increase in loading rate of the particulate filter, and the like. When such a condition is detected in a locomotive, the corresponding bypass control element may be controlled according to the condition (e.g., the bypass control valve is opened more for a greater increase in backpressure than a smaller increase in back pressure). In this manner, emissions compliance may be maintained for a longer duration during tunneling operation while engine performance is also maintained during tunneling operation.

In some examples, regeneration may be carried out in each aftertreatment device before the vehicle in which the aftertreatment device is positioned enters the tunnel. In such an example, the bypass control element may be adjusted during tunneling based on how effectively the pre-tunnel regeneration cleaned the aftertreatment device and how close the regeneration finished relative to the tunnel entrance. For example, if regeneration was miscalculated and the pre-tunnel regeneration was only 20% completed at the time of entering the tunnel, bypassing of the aftertreatment device may occur earlier in the tunnel and/or to a greater extent than if the pre-tunnel regeneration was 80% completed at the time of entering the tunnel.

Further, once the vehicle exits the tunnel, such as the leading locomotive 302 shown in FIG. 3, the bypass control element is adjusted to increase exhaust gas flow through the aftertreatment system. In some examples, the bypass control element may be closed after a predetermined time since the vehicle has exited the tunnel. The predetermined time may be determined individually for each locomotive based on the operating conditions of the locomotive, or the predetermined time may be the same for every locomotive. The predetermined time may be a duration that allows for temperatures of the exhaust gas and aftertreatment device to decrease such that degradation of the aftertreatment device is reduced once the vehicle exits the tunnel. In other examples, the bypass control element may be closed based on the exhaust gas temperature, the aftertreatment device temperature, the particulate loading of each aftertreatment device, or the like. For example, the leading locomotive 302 may need a shorter amount of time to cool down from an elevated temperature than the remote locomotive 306 since it may operate with a lower engine coolant temperature at the tunnel exit, as the leading locomotive 302 ingested less exhaust gas during tunneling operation. Thus, the bypass control elements of some locomotives in a train may close in less time after exiting the tunnel than the bypass control elements of other locomotives in the train.

Figure 4:
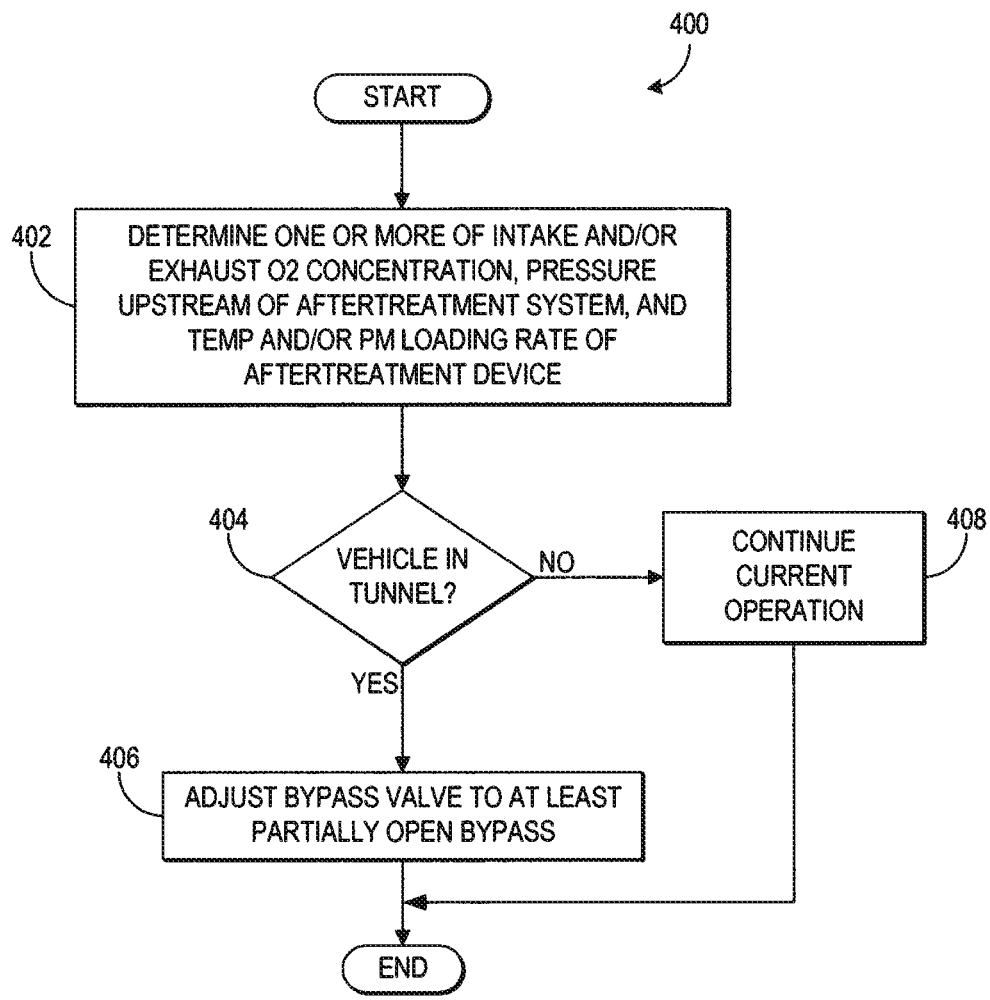
FIG. 4 shows a flow chart illustrating a method for controlling exhaust gas flow through an aftertreatment system during tunneling operation.
Figure 5:
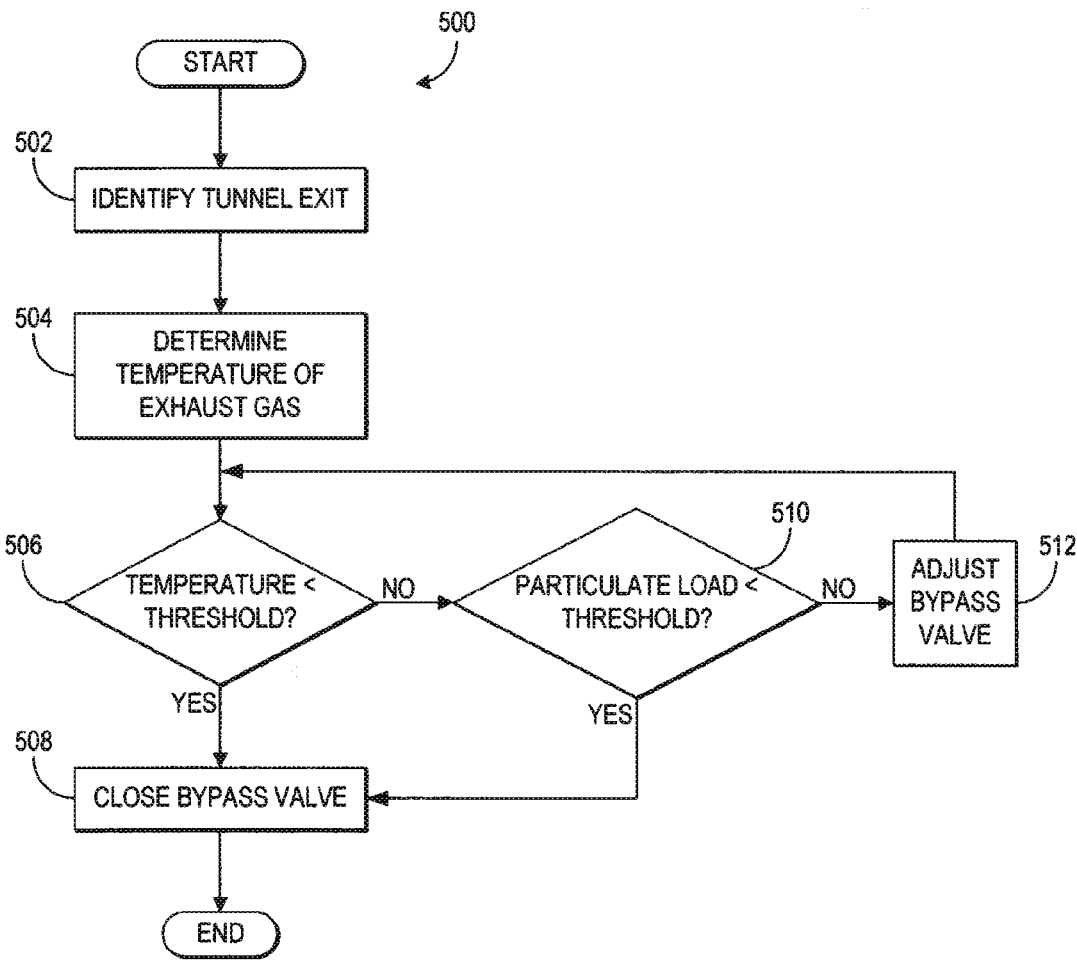
FIG. 5 shows a flow chart illustrating a method for controlling exhaust gas flow through an aftertreatment system after exiting a tunnel.
Figure 6:
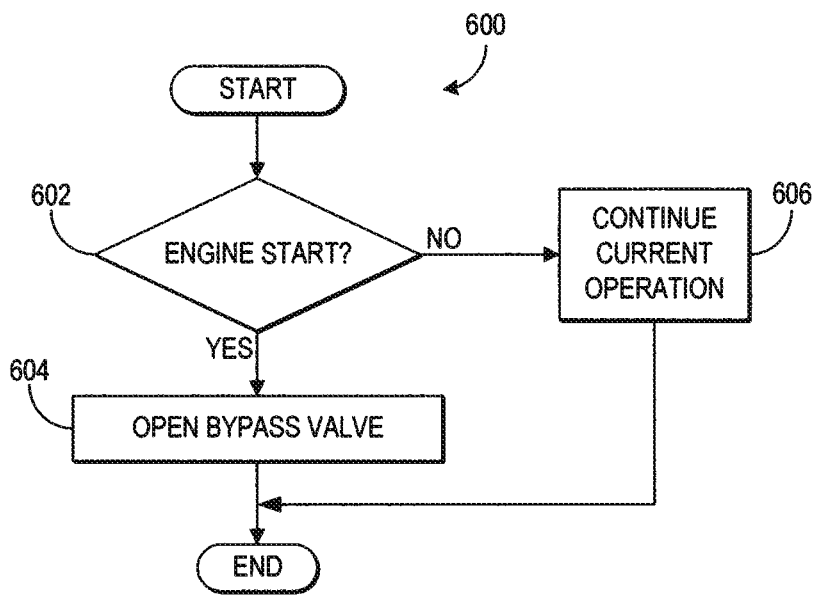
FIG. 6 shows a flow chart illustrating a method for controlling exhaust gas flow through an aftertreatment system.
Figure 7:
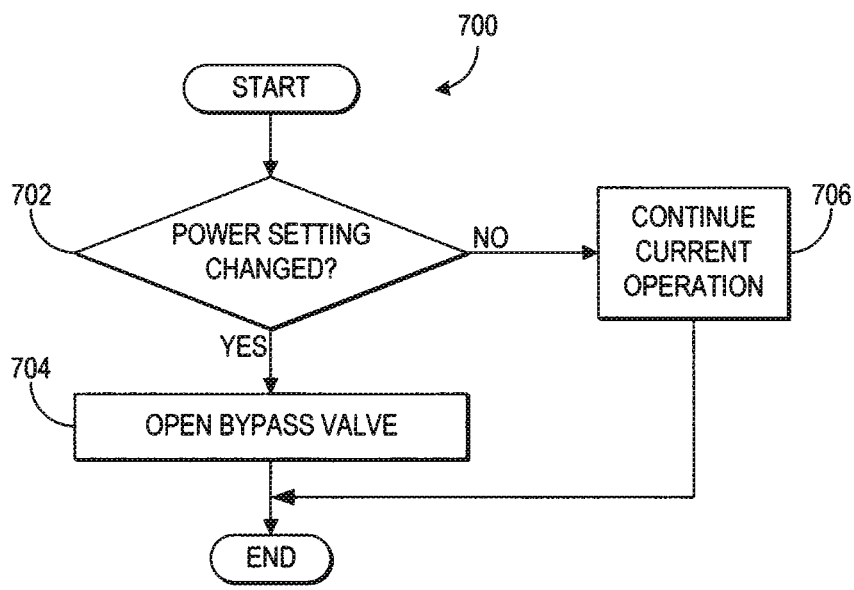
FIG. 7 shows a flow chart illustrating a method for controlling exhaust gas flow through an aftertreatment system.

FIGS. 4-7 show flow charts illustrating methods for controlling a bypass control element operably coupled to a bypass of an aftertreatment system in a vehicle, such as the rail vehicle 106 described above with reference to FIG. 1. In some embodiments, as explained herein, the vehicle may be one of a plurality of rail vehicles in a rail vehicle consist (e.g., train), such as the train 200 described above with reference to FIG. 2. FIG. 4 depicts a method for reducing flow through an aftertreatment device responsive to tunneling operation of the vehicle. FIG. 5 depicts a method for increasing flow through an aftertreatment device responsive to identification of a tunnel exit. FIGS. 6 and 7 show methods for reducing flow through an aftertreatment device under conditions when the vehicle is not travelling through a tunnel.

In one embodiment, a method for an aftertreatment system in a vehicle comprises indicating tunneling operation based on an operating condition. The method further comprises adjusting a bypass control element responsive to the indication of tunneling operation. The bypass control element is operatively coupled to a bypass of the aftertreatment system which routes flow around an aftertreatment device of the aftertreatment system. The aftertreatment system is disposed downstream of a turbine in an exhaust passage of an engine of the vehicle.

FIG. 4 shows a flow chart illustrating an example method 400, such as the method described above. Specifically, the method includes determining if a vehicle is under tunneling operation based on one or more operating conditions. Depending on the operating condition, the bypass control element, such as a bypass valve, is adjusted to reduce exhaust gas flow through the aftertreatment device. For example, the bypass valve may be closed such that flow through the aftertreatment device is substantially reduced (e.g., no flow) or the bypass valve may be adjusted such flow through the aftertreatment device is partially reduced.

At 402, one or more of an oxygen concentration in the intake passage (e.g., intake oxygen concentration) and/or an oxygen concentration in the exhaust passage (e.g., an exhaust oxygen concentration), a pressure in the exhaust passage upstream of the aftertreatment system, and/or a temperature and/or loading rate of the aftertreatment device are determined.

At 404, it is determined if the vehicle is in a tunnel (e.g., under tunneling operation). In one example, it may be determined that the vehicle is in a tunnel based on the intake oxygen concentration and/or exhaust oxygen concentration. For example, outside of the tunnel, intake gasses inducted into the engine are comprised substantially of ambient air, which has known constituent concentrations at a given barometric pressure, or altitude. As the vehicle enters the tunnel, where exhaust gas from other vehicles may be trapped, the constituent concentration of the intake gasses may change, thus also changing exhaust gas constituent concentrations. For example, higher levels of engine exhaust gas trapped in the tunnel may dilute the ambient air inducted by the engine in the tunnel, thereby reducing oxygen concentrations in the intake passage and the exhaust passage. Thus, when an intake oxygen concentration falls below a threshold value or an exhaust oxygen concentration falls below a threshold value, tunneling operation may be indicated.

In another example, it may be determined that the vehicle is in a tunnel based on a pressure measured in the exhaust passage upstream of the aftertreatment system. For example, as the vehicle travels through a tunnel where exhaust gas from other vehicles may be trapped, the engine out soot may increase, thereby increasing a loading rate of the aftertreatment device, such as a particulate filter. As the load of the particulate filter increases, a backpressure on the engine may increase as flow through the aftertreatment device becomes restricted due to the increased load. As such, a pressure in the exhaust passage upstream of the aftertreatment system may increase above a threshold pressure indicating tunneling operation.

In another example, it may be determined that the vehicle is in a tunnel based on a temperature and/or loading rate of the aftertreatment device. For example, as described above, due to ingestion of exhaust gas while the vehicle travels through a tunnel, the engine may generate higher temperature exhaust gas as well as an increased amount of engine out soot, thereby increasing the temperature and the loading rate of the aftertreatment system. Further, because heat rejection may be reduced due to a higher temperature in the tunnel environment, the exhaust gas temperature may be even higher. Thus, tunneling operation may be indicated when a temperature of the aftertreatment device exceeds a threshold temperature and/or a loading rate of the aftertreatment device exceeds a threshold value.

In still other examples, other operating conditions may be utilized to determine if the vehicle is travelling through a tunnel. For example, a GPS may indicate the position of vehicle inside the tunnel, engine oil or coolant temperatures may increase inside the tunnel, an ambient temperature may increase in a tunnel environment, EGR may be turned off in the tunnel, engine operation may be adjusted to compensate for tunneling operation, or the like.

If it is determined that the vehicle is not in a tunnel, the method moves to step 408 and current operation is continued. On the other hand, if it is determined that the vehicle is in a tunnel at step 404, the method proceeds to step 406 and the bypass valve is adjusted to at least partially open the bypass. For example, a control unit, such as the controller 148 described above with reference to FIG. 1, may control the degree to which the bypass valve is open based on the extent to which an operating parameter has changed. As an example, the bypass valve may be adjusted to be more open if an intake oxygen concentration or an exhaust oxygen concentration fall below their respective thresholds by a large amount rather than by a small amount. Likewise, if the change in pressure in the exhaust passage upstream of the aftertreatment system from the threshold pressure is relatively small, the bypass valve may be adjusted such that exhaust gas flow through the aftertreatment device is only slightly reduced. In this manner, the aftertreatment device may be bypassed only as much as needed. As another example, if the loading rate of the particulate filter increases significantly over the threshold value, the bypass valve may be adjusted such that exhaust gas flow through the particulate filter is substantially reduced. In still other examples, the valve may be an on/off valve such that there is either full exhaust gas flow through the aftertreatment device or the exhaust gas flow through the aftertreatment device is substantially reduced.

Thus, the bypass control element, such as a bypass valve, may be controlled to reduce exhaust gas flow through the aftertreatment device during tunneling operation of the vehicle. Further, the degree (i.e., extent) to which the bypass is opened to reduce flow through the aftertreatment device, or the timing within the tunnel (earlier, closer to entrance or later, further from entrance) may be adjusted based on how much an operating parameter, such as intake oxygen concentration or loading rate of the aftertreatment device, is different from a respective threshold. As described above, the extent of bypassing of an aftertreatment device during tunneling operation may also be based on the position of the locomotive in the train. For example, the particulate loading rate may be greater in an aftertreatment device disposed in a remote locomotive than in an aftertreatment device disposed in a leading locomotive, as the remote locomotive ingests a greater amount of exhaust gas than the leading locomotive. In this way, degradation of the aftertreatment device and the engine may be reduced during tunneling operation.

FIG. 5 shows a method 500 for controlling the bypass valve when the vehicle has exited the tunnel. Specifically, the method identifies a tunnel exit and increases flow through the aftertreatment device, such as a particulate filter, based on a temperature and particulate load of the aftertreatment device after the vehicle passes through the tunnel exit.

At step 502, the exit of the tunnel is identified. In some example, the tunnel exit may be identified when the intake oxygen concentration and/or the exhaust oxygen concentration increase above respective thresholds indicating the engine is inducting ambient air that is no longer diluted with exhaust gas. In other examples, the tunnel exit may be identified by a GPS, for example.

At step 504, the temperature of the exhaust gas is determined. As described above, due to ingestion of exhaust gas, the engine may generate higher temperature exhaust gas, thereby increasing a temperature of the aftertreatment system. If the particulate filter has a particulate load that is too high and the temperature of the particulate filter becomes too great, runaway regeneration may occur resulting in degradation of at least the aftertreatment system. Thus, it is determined if the exhaust gas temperature is greater than a threshold temperature at step 506. If the exhaust gas temperature is less than the threshold temperature, the method continues to step 508 and the bypass valve is closed. By closing the bypass valve, exhaust gas flows through the aftertreatment device again and regulated emissions may be reduced such that emissions are compliant.

On the other hand, if it is determined that the temperature is greater than the threshold temperature, the method moves to step 510 where it is determined if the particulate load of the particulate filter is greater than a threshold value. If the particulate load is less than the threshold value, even if the exhaust gas temperature is higher than the threshold temperature, the chance of runaway regeneration may be reduced substantially. As such, the method moves to step 508 and the bypass valve is closed to increase exhaust flow through the aftertreatment device.

If it is determined that the particulate load is greater than the threshold load, the method continues to step 512 where the bypass valve is adjusted. As an example, the degree (i.e., extent) to which the bypass valve is opened may be adjusted based on the temperature of the exhaust gas, the temperature of the aftertreatment device, and/or the particulate load of the aftertreatment device. For example, based on the duration the aftertreatment device was at least partially bypassed during tunneling operation, the amount by which the particulate load exceeds the threshold value may vary. Further, the temperature of the aftertreatment device may vary based on the duration the aftertreatment device was at least partially bypassed during tunneling operation. As such, even if the exhaust gas temperature is greater than the threshold temperature, due to a lower aftertreatment device temperature and/or a small difference between the particulate load and the threshold value, the bypass valve may be adjusted so that at least some exhaust gas flows through the aftertreatment device. The bypass valve may continue to be adjusted until the exhaust gas temperature is low enough or the particulate load is low enough that the valve can be closed. In some examples, the bypass valve may be closed gradually as the temperature of the aftertreatment device decreases. For example, the bypass valve may be closed incrementally based on the falling temperature of the aftertreatment device. Once the temperature of the aftertreatment device falls below a threshold temperature, the bypass valve may be fully closed such that all of the exhaust gas flow passes through the aftertreatment device.

Thus, the bypass control element, such as a bypass valve, may be controlled based on exhaust gas temperature, aftertreatment device temperature, and/or particulate load of the aftertreatment device, to increase the exhaust gas flow through the aftertreatment device in response to identification of a tunnel exit. In this manner, exhaust gas flow through the aftertreatment device may be resumed as quickly as possible such that emissions compliance outside of the tunnel is achieved and degradation of the aftertreatment device is reduced.

Continuing to FIG. 6, a method 600 for controlling a bypass control element, such as a valve, operably coupled to a bypass of an aftertreatment system, such as the aftertreatment system 130 described above with reference to FIG. 1, is shown. Specifically, the method controls the bypass valve based on an engine start.

At step 602, it is determined if the engine is under a start-up condition. For example, engine start may be indicated by one or more of an engine temperature less than a threshold temperature, an engine coolant temperature less than a threshold temperature, or the like.

If is it determined that the engine is not under a start-up condition, the method moves to step 606 and current operation is continued. On the other hand, if it is determined that the engine is under a start-up condition, the method proceeds to step 604 and the bypass valve is opened. In some examples, the bypass valve may be opened such that exhaust flow through the aftertreatment device is substantially reduced. In other examples, the bypass valve may be adjusted such that some exhaust flows through the bypass and some exhaust flows through the aftertreatment system. For example, the extent to which the bypass valve is opened may be based on the temperature of the engine, the temperature of the engine coolant, or another suitable parameter. By at least partially bypassing the aftertreatment device during engine start-up conditions, degradation of the aftertreatment device due to un-burned hydrocarbons in the exhaust gas emitted from the engine may be reduced, for example.

Continuing to FIG. 7, a method 700 for controlling a bypass control element, such as a valve, operably coupled to a bypass of an aftertreatment system, such as the aftertreatment system 130 described above with reference to FIG. 1, is shown. Specifically, the method controls the bypass valve based on transient operating conditions.

At step 702, it is determined if an engine power setting has changed. For example, the power setting may be changed when a notch of a notched throttle coupled to the engine is shifted from a first notch corresponding to a first power setting to a second notch corresponding to a second, different power setting (e.g., from notch 7 to notch 8). As an example, the second power setting may correspond to a higher power level than the first power setting. In some examples, the power setting may be changed by an operator of the vehicle in which the engine system is positioned. In other examples, the power setting may be changed based on a trip plan of the vehicle.

If it is determined that the power setting has not changed, the method moves to step 706 and current operation is continued. On the other hand, if it is determined that the power setting has changed, the method continues to step 704 and the bypass valve is opened such that exhaust gas flow through the aftertreatment device is substantially reduced (e.g., no exhaust flow through the aftertreatment device). In this manner, load rates may be improved during transient conditions.

In still other examples, the bypass control element may be adjusted in response to other engine operating conditions. For example, the bypass control element may be adjusted to reduce flow through the aftertreatment device in response to engine problems such as engine misfire, significant oil leakage, turbocharger failure, or the like. As another example, the bypass control element may be adjusted to reduce flow through the aftertreatment device in response to idle engine operation. In this manner, excessive particulate matter build-up in the aftertreatment device may be reduced such that a possibility of runaway regeneration may be reduced, thereby extending the life of the aftertreatment device.

It should be understood, the methods described above with reference to FIGS. 4-7 may be carried out together in a single engine controller, such as the controller 148 described above with reference to FIG. 1. For example, the engine controller may control bypassing of the aftertreatment device during tunneling operation, during operation immediately following tunnel exit, during transient conditions, and during engine start. That being said, although embodiments have been described in regard to engine controllers or other controllers (e.g., microcontroller or processor-based devices), embodiments of the invention may be implemented using control units more generally. "Control unit" refers to one or more hardware and/or software modules configured to carry out one or more designated functions, e.g., to receive one or more inputs and generate one or more control outputs; a hardware module is an electronic device comprising one or more electronic/electrical components, and a software module is a set or sets of electrically readable instructions, stored in a non-transient tangible medium/media, that when read and executed by a hardware module cause the hardware module to perform one or more designated functions according to the content of the instructions.

Another embodiment relates to a method for an aftertreatment system in a vehicle, e.g., a method for controlling the aftertreatment system or components relating thereto. The method comprises receiving a signal relating to a tunneling operation. ("Relating to" means containing data of the tunneling operation and/or generated in response to the tunneling operation, e.g., responsive to a determination that a tunneling operation may be occurring.) The method further comprises adjusting a bypass control element responsive to the signal. The bypass control element is operatively coupled to a bypass of the aftertreatment system which routes exhaust flow around an aftertreatment device of the aftertreatment system. The aftertreatment system is disposed downstream of a turbine in an exhaust passage of an engine of the vehicle.

In another embodiment, the method further comprises receiving data related to operations, e.g., of the vehicle. The method further comprises identifying the tunneling operation based on the received data. (For example, the data may be assessed at least periodically for determining if the data is indicative of the occurrence of a tunneling operation, within established parameters.) The method further comprises, responsive to identifying the tunneling operation, generating the signal for adjusting the bypass control element.

Another embodiment relates to a system for a vehicle. The system includes a control unit configured to receive data. For example, the data may be received from sensors on the vehicle, or from other control systems or sub-systems in the vehicle. The data may relate to operational conditions of the vehicle (e.g., component temperatures), or operational modes of the vehicle (e.g., the vehicle being in a particular mode of operation, or transitioning from one mode to another). The control unit is further configured to generate a signal, responsive to the data, for controlling a bypass control element to route exhaust gas through a bypass and around an aftertreatment device (or more than one aftertreatment device) of an aftertreatment system associated with a vehicle engine.

In another embodiment, the system additionally includes the bypass and the bypass control element. The bypass is configured for coupling to an exhaust passage of the engine upstream of the aftertreatment device and to the exhaust passage downstream of the aftertreatment device. The bypass control element is configured for operatively coupling to the bypass conduit or to the exhaust passage. When the bypass control element is installed and operatively coupled to the bypass conduit or the exhaust passage, it can be controlled by the control unit to vary a flow of the exhaust gas through the bypass conduit and around the aftertreatment device.

In another embodiment, the control unit is configured to determine passage of the vehicle through a tunnel, based on the received data (e.g., the control unit determines that the vehicle will pass through the tunnel or is passing through the tunnel). The control unit is configured to generate the signal (for controlling the bypass control element) responsive to determining the passage of the vehicle through the tunnel.

Another embodiment relates to a system for a vehicle. The system includes a control unit. The control unit is configured to adjust a bypass control element to reduce exhaust gas flow through an aftertreatment system, in response to an indication of tunneling operation of the vehicle.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, comprising:
   an exhaust passage through which exhaust gas is configured to flow from the engine;
   an EGR passage configured to selectively route at least a portion of the exhaust gas from the exhaust passage to an intake passage of the engine, the EGR passage including an EGR valve;
   an intake oxygen sensor configured to sense an intake oxygen concentration of a mixture of ambient air and, selectively, the portion of the exhaust gas flowing through the intake passage and into the engine;
   a control unit for controlling a position of the EGR valve to vary a flow of EGR through the EGR passage responsive to tunneling operation of the engine; and
   an aftertreatment system disposed in the exhaust passage, the aftertreatment system including an aftertreatment device and an aftertreatment bypass with a bypass control element, and the bypass control element is adjustable by the control unit to selectively control an amount of exhaust gas flow through the aftertreatment device or through the aftertreatment bypass and that is responsive to at least a change in the sensed intake oxygen concentration, and whereby the oxygen concentration in the mixture is controllable in response to the tunneling operation of the engine.

2. The system of claim 1, wherein the bypass control element is self-actuating, based on conditions of the exhaust gas, and wherein EGR is turned off during the tunneling operation.

3. The system of claim 1, wherein the aftertreatment device is a particulate filter, wherein the EGR passage routes exhaust from the exhaust passage upstream of a turbine of a turbocharger to the intake passage downstream of a compressor of the turbocharger, and wherein the control unit is configured to turn the EGR off and on.

4. The system of claim 1, wherein the control unit is configured to control the bypass control element to an open position during the tunneling operation.

5. The system of claim 4, wherein the control unit is further configured to identify a tunnel exit based on a temperature of the exhaust gas and a particulate load of the aftertreatment device, and to control the bypass control element to a closed position in response to identifying the tunnel exit.

6. The system of claim 4, wherein the control unit is further configured to adjust a degree to which the bypass control element is open based on an operating condition.

7. The system of claim 1, wherein the control unit is configured to adjust the bypass control element to reduce exhaust gas flow through the aftertreatment device responsive to an increased loading rate of the aftertreatment device when a temperature of the aftertreatment device is greater than a threshold temperature.

8. The system of claim 1, wherein the control unit is configured to adjust the bypass control element to reduce exhaust gas flow through the aftertreatment device responsive to an increased pressure in the exhaust passage upstream of the aftertreatment system.

9. A method for an aftertreatment system in a vehicle, comprising:
via a controller of an engine of the vehicle:
receiving a first signal from an oxygen sensor disposed in an intake passage of the engine upstream of a turbocharger and upstream of an EGR passage, the EGR passage including an EGR valve, where the oxygen sensor is configured to sense an oxygen concentration of ambient air drawn into the intake passage;
in response to tunneling operation, adjusting the EGR valve to turn off EGR; and
if the sensed oxygen concentration falls below a threshold value responsive to the tunneling operation, generating a second signal; and
adjusting a bypass control element operatively coupled to a bypass of the aftertreatment system responsive to the generated second signal to route exhaust flow around an aftertreatment device of the aftertreatment system, the aftertreatment system disposed downstream of a turbine of the turbocharger in an exhaust passage of the engine.

10. The method of claim 9, further comprising generating the second signal based on one or more of a temperature of the aftertreatment device exceeding a threshold temperature and a loading rate of the aftertreatment device included in the aftertreatment system exceeding a threshold value.

11. The method of claim 9, further comprising generating the second signal based on a pressure in the exhaust passage upstream of the aftertreatment system exceeding a threshold pressure.

12. The method of claim 9, further comprising adjusting the bypass control element to increase exhaust flow through the aftertreatment device based on an exhaust gas temperature and a loading of the aftertreatment device when the sensed oxygen concentration of the ambient air drawn into the intake passage rises above the threshold.

13. The method of claim 9, further comprising adjusting the bypass control element in response to an indication of engine start-up.

14. The method of claim 9, further comprising adjusting the bypass control element in response to an indication of transient conditions.

15. A system for a vehicle, comprising:
an exhaust passage through which exhaust gas is configured to flow from an engine of the vehicle;
an aftertreatment system disposed in the exhaust passage, the aftertreatment system including at least a particulate filter and a bypass with a bypass control element;
an intake oxygen sensor disposed in an intake passage of the engine upstream of a turbocharger; and
a control unit configured to determine an oxygen concentration of ambient air drawn into the intake passage based on a signal received from the intake oxygen sensor of the engine of the vehicle upstream of a turbocharger and at least partially open the bypass control element to reduce exhaust gas flow through the particulate filter responsive to a reduced oxygen concentration of ambient air drawn into the intake passage of the engine upstream of the turbocharger.

16. The system of claim 15, further comprising at least partially opening the bypass control element to reduce exhaust gas flow through the particulate filter responsive to one or more of an increased pressure in the exhaust passage upstream of the aftertreatment system and an increased loading rate of the particulate filter when a temperature of the particulate filter is greater than a threshold temperature.

17. The system of claim 16, wherein the control unit is further configured to control a degree to which the bypass control element is open based on one or more of an extent to which an oxygen concentration in the exhaust passage is reduced, an extent to which the oxygen concentration of ambient air in the intake passage upstream of the turbocharger is reduced, an extent to which the pressure in the exhaust passage upstream of the aftertreatment system increases, or an extent to which the loading rate of the particulate filter increases when the temperature of the particulate filter is greater than the threshold temperature.

18. The system of claim 15, wherein the control unit is further configured to:
identify tunneling operation based on the reduced oxygen concentration of ambient air drawn into the intake passage upstream of the turbocharger, and in response to identification of tunneling operation, at least partially open the bypass control element to reduce exhaust gas flow through the particulate filter; and
identify an exit of a tunnel through which the vehicle is traveling during the tunneling operation, and in response to the identification of the exit of the tunnel, to adjust the bypass control element to increase exhaust gas flow through the particulate filter based on an exhaust gas temperature and a loading of the particulate filter after the vehicle has exited the tunnel.

19. The system of claim 15, wherein a turbine of the turbocharger is positioned in the exhaust passage, wherein the aftertreatment system is disposed downstream of the turbine, wherein an EGR passage routes exhaust from the exhaust passage upstream of the turbine to the intake passage downstream of a compressor of the turbocharger, the EGR passage including an EGR valve, and wherein the control unit is further configured to control the EGR valve to turn EGR off and to reduce exhaust gas flow through the particulate filter responsive to the reduced oxygen concentration of ambient air drawn into the intake passage of the engine upstream of the turbocharger when EGR is turned off.

20. A system for a vehicle comprising:
a control unit configured to receive data;
an aftertreatment device of an aftertreatment system associated with an engine of the vehicle, the aftertreatment device arranged in an exhaust passage of the engine;
a bypass coupling the exhaust passage upstream of the aftertreatment device with the exhaust passage downstream of the aftertreatment device; and
a turbocharger with a turbine positioned in the exhaust passage, the aftertreatment device disposed downstream of the turbine, and a compressor positioned in an intake passage of the engine;
an EGR passage routing exhaust from the exhaust passage upstream of the turbine to the intake passage downstream of the compressor, the EGR passage including an EGR valve controllable by the control unit to turn EGR on and off;
an intake oxygen sensor positioned in the intake passage upstream of the compressor and configured to sense an oxygen concentration of ambient air drawn into the intake passage upstream of the compressor;
wherein the control unit is further configured to:

adjust the EGR valve to turn EGR off in response to tunneling operation; and generate a signal, responsive to the received data, for controlling a bypass control element to route exhaust gas through the bypass and around the aftertreatment device responsive to the tunneling operation, wherein the received data includes the oxygen concentration of ambient air drawn into the intake passage upstream of the compressor.

21. The system of claim 20, wherein the bypass control element is operatively coupled to the bypass or to the exhaust passage and wherein the bypass control element, when operatively coupled to the bypass or the exhaust passage, is controllable by the control unit to vary a flow of the exhaust gas through the bypass and around the aftertreatment device.

22. The system of claim 20, wherein the control unit is configured to determine passage of the vehicle through a tunnel, based on the received data, and wherein the control unit is configured to generate the signal responsive to determining the passage of the vehicle through the tunnel.

23. The system of claim 20, wherein the received data further includes an oxygen concentration in the exhaust passage, and wherein the control unit is configured to determine entry of the vehicle into a tunnel when the oxygen concentration of ambient air drawn into in the intake passage upstream of the compressor or the oxygen concentration in the exhaust passage falls below a threshold.

24. The system of claim 23, wherein the control unit is further configured to determine exiting of the vehicle from the tunnel when the oxygen concentration of ambient air drawn into the intake passage upstream of the compressor or the oxygen concentration in the exhaust passage rises above the threshold, and to reduce a flow of the exhaust gas through the bypass upon exiting of the vehicle from the tunnel.

* * * * *